L. V. ARONSON AND A. HARRIS.
INDICATING DEVICE FOR EXPLOSIVE ENGINES.
APPLICATION FILED MAY 24, 1916.
1,330,570. Patented Feb. 10, 1920.
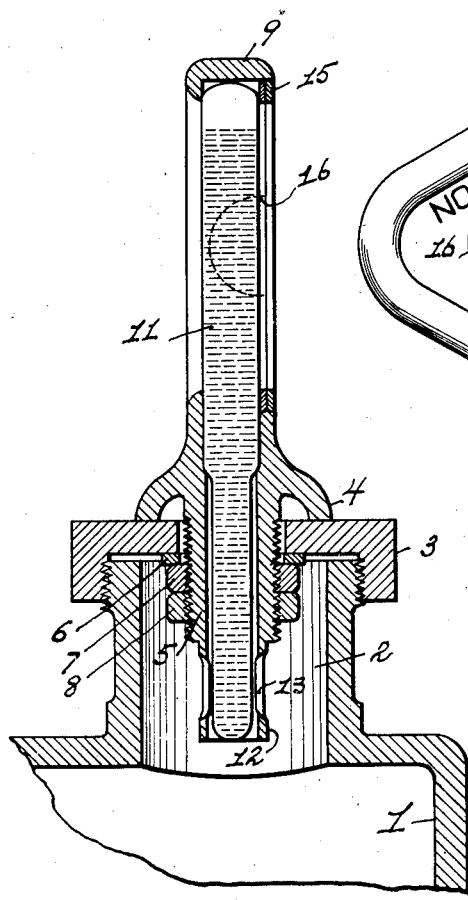
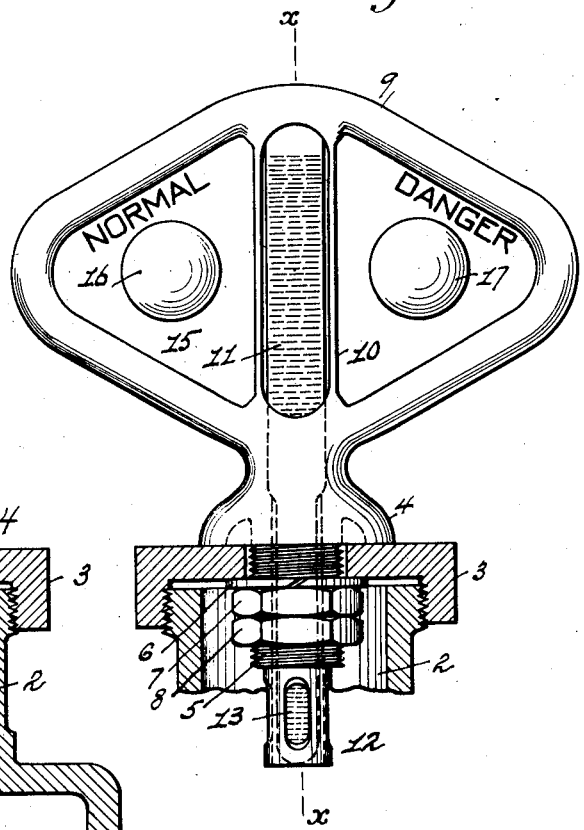

UNITED STATES PATENT OFFICE.

LOUIS V. ARONSON AND ALEXANDER HARRIS, OF NEWARK, NEW JERSEY, ASSIGNORS TO HEAT-OMETER COMPANY, INC., OF NEW YORK, N. Y., A CORPORATION OF NEW YORK.

INDICATING DEVICE FOR EXPLOSIVE-ENGINES.

1,330,570.  Specification of Letters Patent.  Patented Feb. 10, 1920.

Application filed May 24, 1916. Serial No. 99,539.

*To all whom it may concern:*

Be it known that we, LOUIS V. ARONSON and ALEXANDER HARRIS, citizens of the United States, residing in the city of Newark, in the county of Essex and State of New Jersey, have invented certain new and useful Improvements in Indicating Devices for Explosive-Engines, of which the following is a full, clear, and exact description, such as will enable others skilled in the art to which it pertains to make, construct, and use the same, reference being had to the accompanying drawings, and to numerals of reference marked thereon, forming a part of this specification.

Our invention relates to an indicating device generally applicable to stationary and other explosive engines of any character, primarily designed for use in connection with automobiles and the like, for indicating abnormal conditions in internal combustion engines, provided with a liquid circulation cooling system for the cylinders of the engine, the cooling system commonly including a radiator, and having a filler opening closed by the radiator cap.

The objects of our invention are to provide an indicating device, which will not indicate in degrees the temperature of the cooling water, but one which will indicate the condition of the engine, so as to serve as a guide for its safe and efficient operation, and to provide an effective danger signal, secured in the center of the radiator cap, with the lower end of the heat responsive element of the indicator projecting into the radiator.

The heat responsive element of the indicator, in its preferred form, consists of a glass tube, closed at both ends, containing a liquid, red, for instance, or it may be of any other desired color, the red liquid in this instance, representing the safety signal, and which, when subjected to a certain abnormal heat, changes its color from the normal, red, to any desired color, such as green for instance, which in this case, represents the danger signal.

When the condition of the engine is normal, the color of the liquid in the tube or container is normal, whatever color that might be, and when the conditions become abnormal, the color of the liquid in the tube or container becomes abnormal, changing from the normal to any color selected to indicate abnormal or dangerous conditions. As soon as the abnormal engine conditions assume a normal condition, the fluid or liquid in the tube or container simultaneously and automatically changes its danger color back to the normal color, so that an automatic danger signal is provided.

The strength of the solution or liquid can be varied, so that the color change occurs anywhere from 170° to 195°, or in ranges varying above or below said numbers.

In this way, an indicating device or signal is provided which forms an always present danger signal or guide for the operator, indicating to him the condition of the engine, and enabling him to secure the best results while operating the same.

The construction and operation of our device will be more fully described in the specification which follows, and in the drawings which form a part thereof, wherein we have shown a preferred embodiment of our invention.

As illustrative of the principle thereof, it is to be understood, however, that we do not limit ourselves to such embodiment, but desire to cover our invention broadly, and in the different applications for which it is susceptible.

Throughout the specification and drawings, like reference numerals are employed to indicate corresponding parts, and in the drawings, Figure 1 represents a front elevation of our improved device; and Fig. 2 represents a vertical section taken on lines x—x of Fig. 1, showing the manner in which the indicator is fastened to the radiator cap, the lower end of the indicating device extending therewithin.

In the drawings, 1 represents the radiator of an automobile or the like, the same being provided with the customary opening 2 for supplying or replenishing the radiator with the cooling fluid, the opening 2 having the usual cap 3, preferably threaded thereon. The top of the cap 3 is centrally apertured for the reception of the indicating device.

The device is secured to the cap 3 and supported thereon by means of an annular flange 4, preferably formed integral with the frame of the device, and a screw-threaded projection 5, which extends downwardly within the aperture or opening in the radiator cap 3. The washer or gasket 6 passing thereover, and engaging with the under surface of the cap 3, the lock nuts 7 and 8 being screwed home on the projecting portion 5, thereby firmly clamping the top portion of the cap between the flange 4 and the washer 6, thereby making the indicator rigid therewith.

The body or frame portion 9 of our preferred form of indicator, of which the flange 4 is a part, may be of any desired configuration, and is preferably provided with an integral central support 10, supporting the upper end of the glass tube 11 containing the indicating fluid. The glass tube 11 is centrally positioned in the device, and the enlarged end of the tube is supported within the central support 10 of the frame 9, and the lower reduced portion of the glass tube extends through the projecting portion 5 of the frame, which is provided with a central bore. The glass tube 11 thus supported is held in the frame 9 by means of a plate 15 which is secured in any convenient or desired manner, preferably in a recess formed on the rear side of the body or frame portion 9.

The projecting portion 5 of the frame 9, at its lower end, is provided with a reduced portion 12, which portion is provided with a plurality of apertures or holes 13. It will thus be seen that the reduced portion of the tube containing the indicating fluid, extends into the radiator, thereby causing the indicating fluid contained in said tube to change its normal color to the danger color by responding to changes in temperature of the atmosphere within the radiator.

A plate 15 is secured in any convenient or desired manner, preferably in a recess formed on the rear side of the body or frame portion 9 of our device, and to the front of which is secured, also in any desired or convenient manner, two glass beads or buttons 16 and 17, or equivalent devices, one on each side of the tube 11, as clearly indicated in the drawings. Above the bead 16 on the left-hand side of the tube, the word "Normal" is printed on the plate, and above the other bead 17, on the right-hand side of the tube, the word "Danger" is printed on the plate, the color of the bead or button 16 indicating "normal" and therefore corresponding with the normal color of the liquid contained in the tube 11, and the color of the bead or button 17 indicating "danger" corresponding with the color of the liquid in the tube when the said liquid has been subjected to a certain abnormal heat sufficient to change its color from the normal to the danger color. The liquid contained in the tube 11 consists preferably of cobalt chlorid, sodium chlorid and glycerin.

It will be noticed that our invention is in no way limited to the exact shape shown, or materials described, as any sort of frame or any type of tube containing any form of liquid, which will provide an effective danger signal, by changing its color from the normal to any desired color, when indicating abnormal conditions in internal combustion engines, can be used.

Having thus described our invention, what we claim as new herein and desire to secure by Letters Patent is:—

1. A device of the class described, a container secured to a radiator cap, one end of which is located in the radiator and the other end projecting above the cap, a liquid in said container capable of automatically changing its normal color to an abnormal one simultaneously when the normal conditions of the engine become abnormal and which changes its color back to normal when the engine conditions become normal.

2. A device of the class described, designed to be secured to a radiator cap, comprising a container mounted in a frame, said container containing a liquid adapted to change its normal color by responding to changes in temperature of the atmosphere within the radiator.

3. A device of the class described, a container secured to a radiator cap, one end of which is located in the radiator and the other end projecting above the cap, a liquid in said container capable of automatically changing its normal color to an abnormal one simultaneously when the normal conditions of the engine become abnormal and which changes its color back to normal when the engine conditions become normal, and two colored elements mounted in said frame in close proximity to the said container, the color of one colored element corresponding to the normal color of the liquid in said container, and the color of the other colored elements corresponding with the color of the liquid contained in the container when said liquid has been subjected to a certain abnormal heat sufficient to change its normal color.

This specification signed and witnessed this 22nd day of May, 1916.

LOUIS v. ARONSON.
ALEXANDER HARRIS.

Witnesses:
 FRED'K C. FISCHER,
 CLIFFORD A. ALLISTON.